US006358319B1

(12) United States Patent
Huykman et al.

(10) Patent No.: US 6,358,319 B1
(45) Date of Patent: Mar. 19, 2002

(54) MAGNETIC METHOD AND APPARATUS FOR DEPOSITING GRANULES ONTO AN ASPHALT-COATED SHEET

(75) Inventors: William Huykman, St. Louisville; David P. Aschenbeck, Newark; John D. Phillips, Pataskala, all of OH (US)

(73) Assignee: Owens Corning Fiberglass Technology, Inc., Summit, IL (US)

(*) Notice: Subject to any disclaimer, the term of this patent is extended or adjusted under 35 U.S.C. 154(b) by 0 days.

(21) Appl. No.: 09/451,653

(22) Filed: Nov. 30, 1999

(51) Int. Cl.[7] .......................... B05C 7/06; B05C 19/00; B65G 15/58

(52) U.S. Cl. ....................... 118/308; 118/322; 118/324; 209/218; 198/690.1; 427/191

(58) Field of Search ................................ 118/200, 308, 118/322, 324, 325; 427/186, 188, 127, 128, 191, 199, 598, 180, 202; 198/690.1, 472.1; 209/636, 218

(56) References Cited

U.S. PATENT DOCUMENTS

| | | | |
|---|---|---|---|
| 2,279,361 A | 4/1942 | Amstuz | |
| 2,370,636 A | 3/1945 | Carlton | |
| 2,371,605 A | 3/1945 | Carlton et al. | |
| 2,680,079 A | 6/1954 | Huebner | |
| 2,728,685 A | 12/1955 | Muench | |
| 2,940,422 A | 6/1960 | Dott | |
| 3,888,207 A | 6/1975 | Stutz et al. | |
| 3,926,792 A | * 12/1975 | Buford | 209/215 |
| 4,060,647 A | 11/1977 | Pan et al. | |
| 4,385,079 A | 5/1983 | Gernez | |
| 4,826,703 A | 5/1989 | Kisler | |
| 4,874,652 A | 10/1989 | Hollander | |
| 5,186,980 A | 2/1993 | Koschitzky | |
| 5,219,695 A | 6/1993 | Tanikawa | |
| 5,256,513 A | 10/1993 | Kawamura et al. | |
| 5,355,202 A | 10/1994 | Moriya | |
| 5,415,717 A | 5/1995 | Perneborn | |
| 5,567,468 A | 10/1996 | Lucas | |
| 5,574,545 A | 11/1996 | Hosoi et al. | |
| 5,664,385 A | 9/1997 | Koschitzky | |
| 5,746,830 A | 5/1998 | Burton et al. | |
| 5,795,389 A | 8/1998 | Koschitzky | |
| 5,814,369 A | 9/1998 | Bockh et al. | |

FOREIGN PATENT DOCUMENTS

| | | |
|---|---|---|
| EP | 0 951 940 A2 | 10/1999 |

* cited by examiner

*Primary Examiner*—Linda Gray
*Assistant Examiner*—Yewebdar T. Tadesse
(74) *Attorney, Agent, or Firm*—Inger H. Eckert; James J. Dottavio

(57) ABSTRACT

A method of applying blend drop granules to an asphalt coated sheet includes moving an asphalt coated sheet in a machine direction, and depositing blend drops of granules on a blend drop conveyor that is positioned above the asphalt coated sheet. The blend drop conveyor has an upper flight moving in a direction opposite the machine direction and a lower flight moving in the machine direction. The blend drops are moved from the upper flight to the lower flight of the blend drop conveyor while retaining the blend drops in contact with the blend drop conveyor by magnetic force. Finally. The blend drops are released from the blend drop conveyor for contact with the asphalt coated sheet.

20 Claims, 7 Drawing Sheets

MAGNETIC METHOD AND APPARATUS FOR DEPOSITING GRANULES ONTO AN ASPHALT-COATED SHEET

TECHNICAL FIELD AND INDUSTRIAL APPLICABILITY OF THE INVENTION

This invention relates to asphalt-based roofing materials, and in particular to depositing protective and decorative shingle granules onto an asphalt coated sheet, for such uses as asphalt strip shingles.

BACKGROUND OF THE INVENTION

Asphalt-based roofing materials, such as roofing shingles, roll roofing and commercial roofing, are installed on the roofs of buildings to provide protection from the elements, and to give the roof an aesthetically pleasing look. Typically, the roofing material is constructed of a substrate such as a glass fiber mat or an organic felt, an asphalt coating on the substrate, and a surface layer of granules embedded in the asphalt coating.

A common method for the manufacture of asphalt shingles is the production of a continuous sheet of asphalt material followed by a shingle cutting operation which cuts the material into individual shingles. In the production of asphalt sheet material, either a glass fiber mat or an organic felt mat is passed through a coater containing hot liquid asphalt to form a tacky, asphalt coated sheet. Subsequently, the hot asphalt coated sheet is passed beneath one or more granule applicators which discharge protective and decorative surface granules onto portions of the asphalt sheet material.

In the manufacture of colored shingles, two types of granules are typically employed. Headlap granules are granules of relatively low cost used for the portion of the shingle which will be covered up on the roof. Colored granules or prime granules are of relatively higher cost and are applied to the portion of the shingle that will be exposed on the roof.

To provide a color pattern of pleasing appearance, the colored portion of the shingles may be provided with areas of different colors. Usually the shingles have a background color and a series of granule deposits of different colors or different shades of the background color. A common method for manufacturing the shingles is to discharge blend drops onto spaced areas of the tacky, asphalt coated sheet. Background granules are then discharged onto the sheet and adhere to the tacky, asphalt coated areas of the sheet between the granule deposits formed by the blend drops. The term "blend drop", as used herein, refers to the flow of granules of different colors or different shades of color (with respect to the background color) that is discharged from a granule blend drop applicator onto the asphalt coated sheet. The patch or assemblage of the blend drop granules on the asphalt coated sheet is also referred to as the "blend drop".

One of the problems with conventional granule application equipment is that it depends on mechanical movement to discharge blend drops onto the moving asphalt coated sheet. Usually the granules are fed from a hopper by means of a fluted roll from which, upon rotation, the granules are discharged onto the sheet. The roll is ordinarily driven by a drive motor, and the roll is positioned in the drive or non-drive position by means of a brake-clutch mechanism. The requirement for mechanical action has inherent limitations which prevent a very precise beginning and ending to the blend drop. Also, once the mechanical action takes place, there is a short time lag as the inertia of the granules is overcome. Consequently, there is a limit to the sharpness of the blend drops on the shingle. As shingle manufacturing lines go up in speed, the lack of sharpness is accentuated and the distinction between the blend drop granule deposits, and the background color becomes fuzzy. The lack of sharpness puts a severe limitation on the kinds of patterns and color contrasts that can be applied to shingles at high production speeds.

A known granule depositing method designed to overcome the sharpness problem of conventional granule applicators is shown in U.S. Pat. No. 5,795,389 issued to Koschitzky, which is hereby incorporated by reference in its entirety. The Koschitzky reference discloses an auxiliary belt onto which a series of patches of granules is deposited. The auxiliary belt is positioned above the asphalt coated sheet, and includes an upper flight and a lower flight, with the upper flight travelling in a direction opposite that of the asphalt coated sheet. At the upstream end of the auxiliary belt (i.e., upstream with respect to the movement of the asphalt coated sheet) the upper flight of the auxiliary belt turns around a belt roller to form the lower flight. A retaining conveyor is wrapped around the upstream end of the auxiliary conveyor to keep the granules from flying about as the granules are turned into a downward direction. The granules of each of the patches are dropped vertically straight down onto the asphalt coated sheet to form blend drops. After the blend drops are applied to the asphalt coated sheet the background granules are applied to form a granule coated sheet, which is then cooled and cut into individual granule coated shingles. The Koschitzky patent also discloses that a shroud, instead of a retaining conveyor, can be used to direct the granules into a downwardly directed vertical stream of granules.

While the retaining conveyor disclosed in the Koschitzky patent is able to successfully turn down the granules from the auxiliary conveyor, as the vertically moving granules make impact with the moving asphalt coated sheet, a significant portion of the granules bounces on the sheet, landing downstream and thereby causing fuzzy blend drop edges rather than sharply defined leading and trailing edges for the blend drop. This problem is magnified when the asphalt coated sheet is operated at high speeds.

U.S. Pat. No. 5,814,369 to Bockh et al. discloses another blend drop granule applicator having an applicator roll positioned to rotate directly above a moving asphalt coated sheet. The Bockh et al. reference is hereby incorporated by reference in its entirety. Granules corresponding to a desired blend drop are deposited onto the applicator roll at the top of the rotation, and when the applicator roll rotates approximately 180 degrees the blend drop falls off onto the asphalt coated sheet when the blend drop reaches the bottom of the rotation. A media retaining belt engages the applicator roll, contacting and wrapping around the applicator roll to hold the blend drop granules on the surface of the applicator roll until the applicator roll rotates about 180 degrees. At the point where the media retaining belt stops contacting or becomes disengaged from the applicator roll, the blend drop granules are released to drop onto the moving asphalt coated sheet to form the blend drop. The Bockh et al. patent states that the distance that the granules fall from the applicator roll to the asphalt coated sheet should be minimized. The Bockh et al. patent further states that the linear velocity of the applicator roll should be synchronized with that of the moving asphalt coated sheet so that the granules can be dropped precisely in the desired pattern.

There are other known procedures for depositing granules onto asphalt coated sheets. U.S. Pat. No. 2,371,605 to Carlton et al. discloses apparatus for applying grit particles or granules onto an adhesive coated sheet to make a particle coated sheet, such as a shingle. The particulate material that is falling to the coated sheet is subjected to an electromagnetic field to axially align the air-borne particles with respect to the adhesive coated sheet so that the particles will have a preferred orientation on the sheet. The preferred electrodes for affecting the air-borne particles are disc electrodes. U.S. Pat. No. 2,370,636 to Carlton discloses apparatus for coating substrates with particulate grit material by using a magnet (either an electromagnet or a permanent magnet) for attracting the particulate material to the substrate.

It would be advantageous if there could be developed a shingle blend drop technique that enables blend drops to be accurately placed on a moving asphalt coated sheet with sharply defined edge definition at high operating speeds.

SUMMARY OF THE INVENTION

The above objects as well as other objects not specifically enumerated are achieved by a method of applying blend drop granules to an asphalt coated sheet, including moving an asphalt coated sheet in a machine direction, and depositing blend drops of granules on a blend drop conveyor that is positioned above the asphalt coated sheet. The blend drop conveyor has an upper flight moving in a direction opposite the machine direction and a lower flight moving in the machine direction. The blend drops are moved from the upper flight to the lower flight of the blend drop conveyor while retaining the blend drops in contact with the blend drop conveyor by magnetic force. Finally. The blend drops are released from the blend drop conveyor for contact with the asphalt coated sheet.

According to this invention, there is also provided apparatus for applying blend drop granules to an asphalt coated sheet comprising a blend drop conveyor for receiving blend drop granules, where the blend drop conveyor is positioned above an asphalt coated sheet traveling in a machine direction. The blend drop conveyor has an upper flight moving in a direction opposite the machine direction and a lower flight moving in the machine direction. A magnet is provided for retaining the blend drops in contact with the blend drop conveyor by magnetic force while the blend drops are moved from the upper flight to the lower flight of the blend drop conveyor, and for releasing the blend drops onto the asphalt coated sheet.

According to this invention, there is also provided a method of applying blend drop granules to an asphalt coated sheet comprising moving an asphalt coated sheet in a machine direction, generating vertically moving blend drops of granules, changing the direction of the blend drops of granules to a generally horizontal orientation in the machine direction using magnetic force, and releasing the blend drops for contact with the asphalt coated sheet.

According to this invention, there is also provided apparatus for applying blend drop granules to an asphalt coated sheet comprising a blend drop depositing apparatus for generating vertically moving blend drops of granules, where the blend drop apparatus is positioned above an asphalt coated sheet moving in a machine direction. A magnet is provided for changing the direction of the blend drops of granules to a generally horizontal orientation in the machine direction, and for releasing the blend drops onto the asphalt coated sheet.

According to this invention, there is also provided a method of applying blend drop granules to an asphalt coated sheet including moving an asphalt coated sheet in a machine direction, generating a stream of blend drop granules, and intercepting the stream of blend drop granules with an array of magnets. The array includes some magnets that are switched on to attract the blend drop granules and create a blend drop, and the array includes areas without switched on magnets that do not attract granules and from which the granules fall as a waste stream of granules. The direction of the blend drops of granules is changed to a generally horizontal orientation in the machine direction, and the blend drops are released for contact with the asphalt coated sheet. The waste stream granules is recovered.

According to this invention, there is also provided apparatus for applying blend drop granules to an asphalt coated sheet comprising a blend granule applicator for generating a stream of blend drop granules. The blend granule applicator is positioned above an asphalt coated sheet moving in a machine direction. An array of magnets, including some magnets that are switched on to attract the blend drop granules and create a blend drop, and including areas without switched on magnets that do not attract granules and from which the granules fall as a waste stream of granules, is provided. The array of magnets is mounted for movement so that the blend drops are changed from a generally vertical direction to a generally horizontal orientation in the machine direction before release of the blend drops for contact with the asphalt coated sheet.

Various objects and advantages of this invention will become apparent to those skilled in the art from the following detailed description of the preferred embodiment, when read in light of the accompanying drawings.

DETAILED DESCRIPTION OF THE INVENTION

Figure 1:
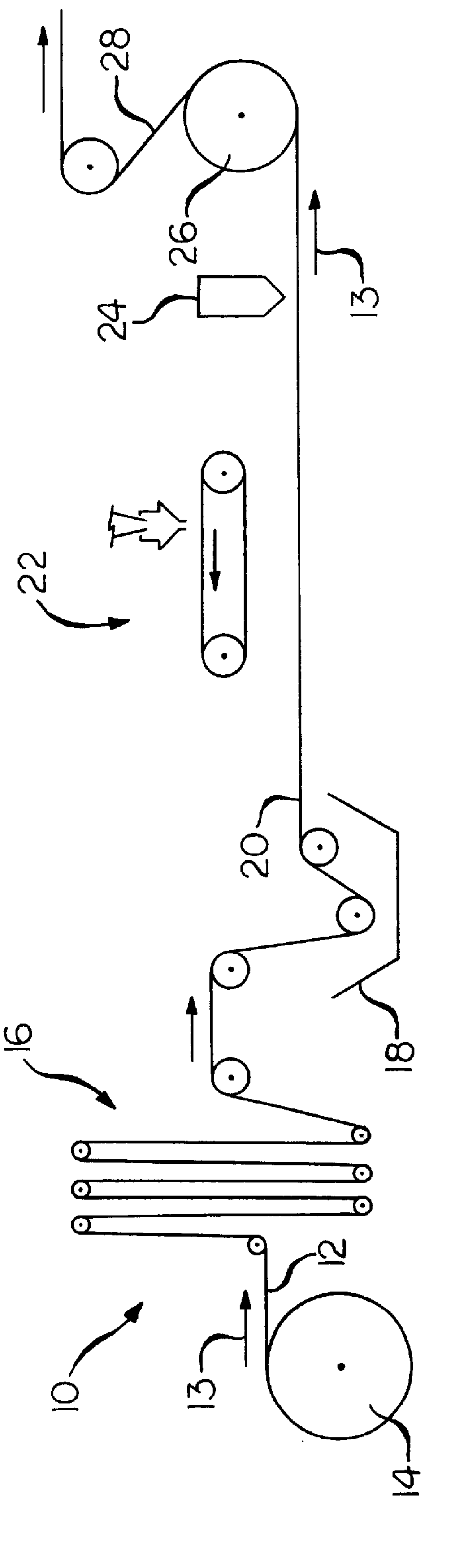
FIG. 1 is a schematic view in elevation of apparatus for manufacturing an asphalt-based roofing material according to the invention.

Referring now to the drawings, there is shown in FIG. 1 an apparatus 10 for manufacturing an asphalt-based roofing material according to the invention. The illustrated manufacturing process involves passing a continuous sheet 12 in a machine direction 13 through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute).

In a first step of the manufacturing process, the continuous sheet 12 of substrate is payed out from a roll 14. The substrate can be any type known for use in reinforcing asphalt-based roofing materials, such as a web, scrim or felt of fibrous materials such as mineral fibers, cellulose fibers, rag fibers, mixtures of mineral and synthetic fibers, or the like. Combinations of materials can also be used in the substrate. Preferably, the substrate is a nonwoven wet process mat or web of glass fibers.

The sheet of substrate is passed from the roll through an accumulator 16. The accumulator allows time for splicing one roll of substrate to another, during which time substrate within the accumulator is fed to the manufacturing process so that the splicing does not interrupt manufacturing.

Next, the sheet is passed through a coater 18 where an asphalt coating is applied to the sheet to form an asphalt coated sheet 20. The asphalt coating can be applied in any suitable manner. In the illustrated embodiment, the sheet is submerged in a supply of hot, melted asphalt coating to completely saturate and cover the sheet with the tacky coating. However, in other embodiments, the asphalt coating could be sprayed on, rolled on, or applied to the sheet by other means. When an organic felt is used as the substrate, it may be desirable to first saturate the felt with a saturant asphalt, and then coat the upper and lower surfaces of the felt with an asphalt coating containing a filler.

The term "asphalt coating" means any type of bituminous material suitable for use on a roofing material, such as asphalts, tars, pitches, or mixtures thereof. The asphalt can be either a manufactured asphalt produced by refining petroleum or a naturally occurring asphalt. The asphalt coating can include various additives and/or modifiers, such as inorganic fillers or mineral stabilizers, organic materials such as polymers, recycled streams, or ground tire rubber. Preferably, the asphalt coating contains an asphalt and an inorganic filler or mineral stabilizer.

The asphalt coated sheet 20 is passed beneath a blend drop application station indicated generally at 22, where blend drop granules are applied to the asphalt coated sheet. Although only one blend drop application station 22 is shown, it is to be understood that several blend drop application stations can be used. Also, the blend drop application station 22 can be adapted to supply several streams of blend drops, or blend drops of different colors, shading or size.

The asphalt coated sheet 20 is then passed beneath a background granule dispenser 24 for the application of background granules. After the introduction of the background granules, the sheet is turned around a slate drum 26 to press the granules into the asphalt coating and to temporarily invert the sheet. The granule coated sheet 28 is then cooled, cut and packaged in any suitable manner, not shown. The cooling cutting and packaging operations are well known in the art.

Figure 2:
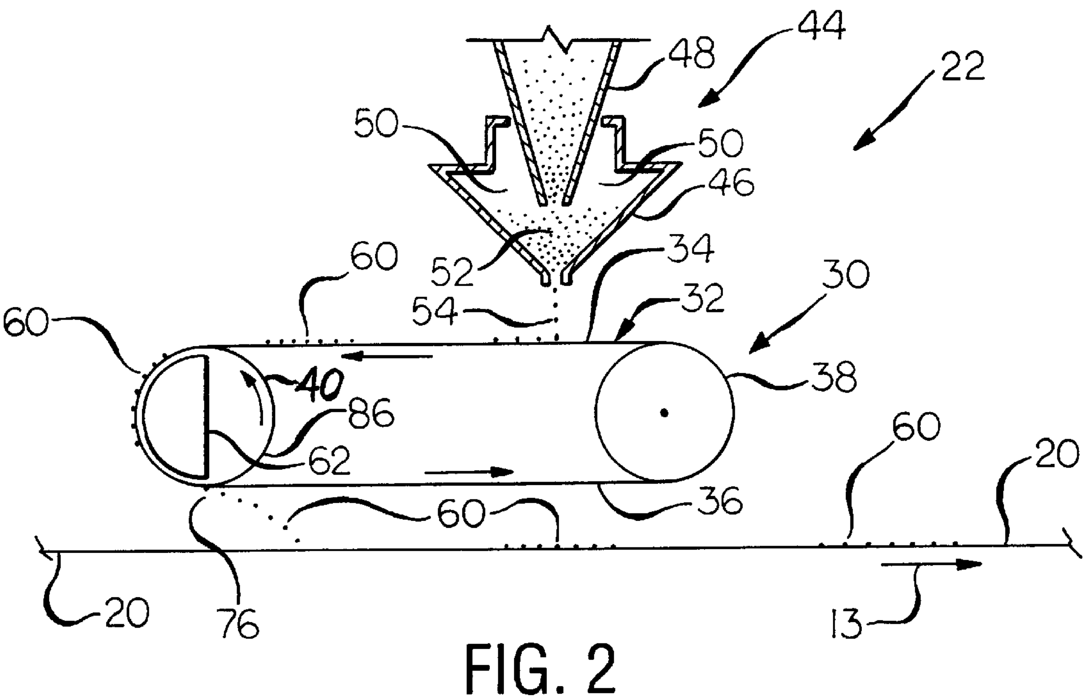
FIG. 2 is an enlarged schematic view in elevation of the blend drop portion of the apparatus of FIG. 1, partially cut away, showing a stationary magnet.

As shown in FIG. 2, the blend drop application station 22 includes a blend drop conveyor 30 having a belt 32 with an upper flight 34 and a lower flight 36. The belt 32 travels around a forward roller 38 and a rear roller 40 which separate or space apart the upper flight 34 and the lower flight 36. The blend drop conveyor is operated by a motor, not shown, with the upper flight 34 traveling in a direction opposite the machine direction 13, and the lower flight 36 traveling in the machine direction 13. Both the upper and lower flights 34 and 36 are in planes that are generally parallel to the plane of the asphalt coated sheet 20.

Positioned above the upper flight is a blend drop applicator 44, shown in cross section, which includes a nozzle 46 and a hopper 48. A pneumatic device, not shown, changes the pressure in the air chamber 50 to instantaneously start and stop the flow of granules 52 from the nozzle 46. The pneumatically assisted blend drop applicator 44 is disclosed in more detail in U.S. Pat. No. 5,746,830 to Burton et al., which is hereby incorporated by reference in its entirety. The opening of the nozzle 46 causes a flow or stream 54 of granules to drop toward the upper flight 34. The nozzle is controlled to allow the flow of granules to have a definite or finite beginning and ending, and the resulting collection or assemblage of granules on the upper flight is a blend drop 60.

In order to place the blend drops 60 onto the asphalt coated sheet 20, the conveyor belt 32 travels around the rear roller 40, moving the blend drops 60 from the upper flight 34 to the lower flight 36. While the blend drops 60 are being turned around the rear roller 40, the blend drops are maintained in contact with the blend drop conveyor 30 by means of a magnet 62. The magnet 62 can be any means suitable for providing sufficient magnetic force to hold the granules in contact with the belt 32, even when the belt turns upside down along the lower flight 36. As shown, the magnet has a semi-cylindrical shape and is stationary, mounted within the rear roller so that the rear roller rolls around the magnet. The magnet 62 can have other shapes, such as a quarter circle cross-sectional shape, not shown, merely providing a magnetic force in the southwest or lower left quadrant of the area of the roller 40, as viewed in FIG. 2, as long as it still can apply sufficient magnetic force to retain the granules in contact with the belt 32. The movement of the belt 32 around the roller 40 under the influence of magnetic force changes the direction of the granules to a generally horizontal orientation in the machine direction. Obviously, the roller 40 must be capable of allowing the magnetic force from the magnet 62 to be transferred through the roller to influence the path of the granules. To this end, the roller is preferably made of a non-metallic material.

The magnet 62 can be an electromagnet connected to a source of AC power, not shown, or any other source of power. Alternatively, the magnet can be a permanent magnet. The purpose of the magnet is to attract the granules to the belt 32 so that they do not fall off or move relative to each other as the belt turns around the roller, thereby preserving the shape and size of the pattern of granules initially laid out in the blend drops 60 on the upper flight 34. Shingle granules are typically made of small rock particles, and are coated with a ceramic coating for coloring and weatherability purposes. The amount of response by various granules to the presence of an electromagnetic field may vary depending on the source of the rock from which the granules are derived. It may be advantageous to use more highly responsive rock materials for the blend drop granules when practicing the invention. The magnetic susceptibility range for rocks typically used as roofing granules is within the range of from about $5\times10^{-5}$ to about $5\times10^{-3}$ emu/cm$^3$ where an emu is an electromagnetic unit. Preferably, the magnet applies to the granules a magnetic flux density within the range of from about 5,000 to about 20,000 Gauss. This is typical of a rare earth magnet.

As the blend drops 60 traveling on the upper flight 34 of the conveyor 32 reach the rear roller 40, there is a natural tendency for the momentum of the granules to cause them to fall off or fly away from the conveyor 32. This tendency is overcome by the attractive magnetic force exerted on the granules by the magnet 62, which holds the granules on the belt 32 as the belt travels around the roller 40. At the bottom or lowest point 76 of the roller 40 the lower flight 36 of the belt 32 separates from the roller and the magnetic force from the magnet 62 on the granules in the blend drop is no longer sufficient to maintain the blend drop in contact with the belt 32. Therefore, the granules are released. It can be seen that the granules are travelling the machine direction 13 when they are released. The speed of the belt 32 can be at any desired speed: equal to, greater than or less than the speed of the asphalt coated sheet 20. To result in the sharpest definition of the edges of the blend drops on the asphalt coated sheet it may be advantageous for the blend drops to be released from the belt 32 at a speed that approximates the speed of the asphalt coated sheet. Also, for minimal distortion of the shape of the blend drops 60 after they are released, the blend drops should be released as close as possible to the moving asphalt coated sheet 20.

Figure 3:
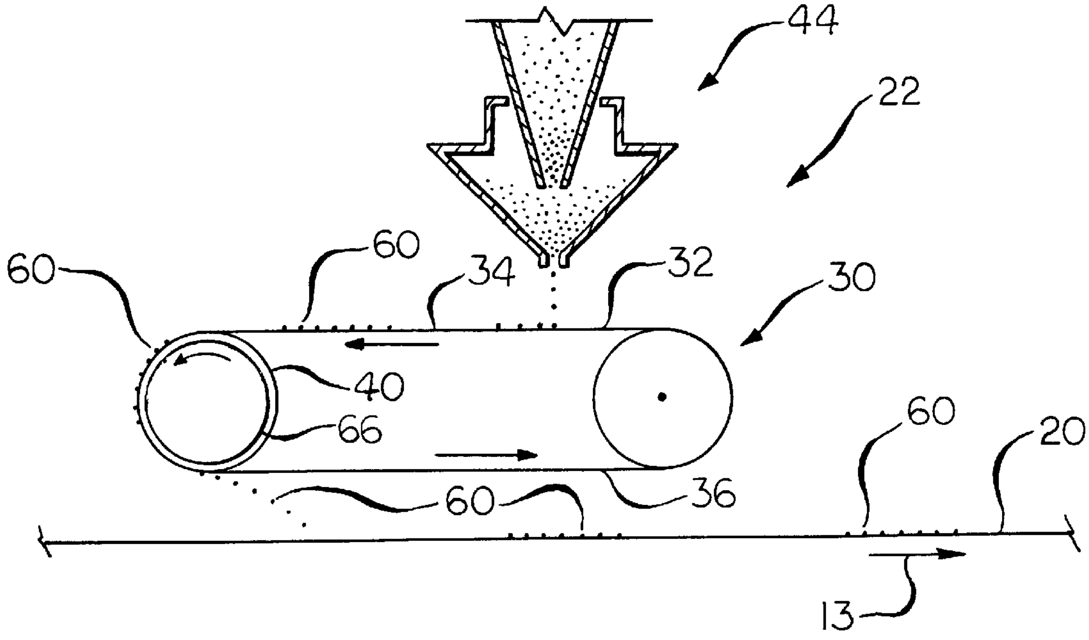
FIG. 3 is a schematic view similar to FIG. 2, illustrating another embodiment of the invention having a rotating magnet.

The embodiment of the invention shown in FIG. 3 is similar to that shown in FIG. 2 except that the rear roller 40 includes a rotating magnet 66 that is mounted within the roller 40 for rotation. Therefore, the rotating magnet 66 rotates with the roller, and exerts its attractive force on the granules of the blend drops 60 traveling on the belt 32, around the rear roller 40. The natural tendency for the granules of the blend drops 60 to separate from the belt 32 is overcome by the attractive magnetic force exerted on the granules by the magnet 66, which holds the granules on the belt 32 as the belt travels around the roller 40. At the bottom of the roller 40 the lower flight 36 of the belt 32 separates from the roller and the magnetic force from the magnet 66 on the granules in the blend drop is no longer sufficient to maintain the blend drop in contact with the belt 32. Therefore, the granules are released. It can be seen that the granules are travelling in the machine direction 13 when they are released.

Although only one source of blend drop granules is shown in FIGS. 1–3 (i.e., blend drop applicator 44), the method of the invention can employ several blend drop depositing mechanisms so that blend drops of several different colors or shades can be dropped onto the upper flight 34 according to any desired pattern. Also, although the embodiments of the invention illustrated in FIGS. 1–3 above use a pneumatically controlled granule applicator 44 as the blend drop apparatus for creating the blend drops on the upper flight 34 of the blend drop conveyor, it is to be understood that many other methods can be employed to form the blend drops 60 on the blend drop conveyor. For example, several methods are disclosed in the above mentioned patent reference to Koschitzky.

Figure 4:
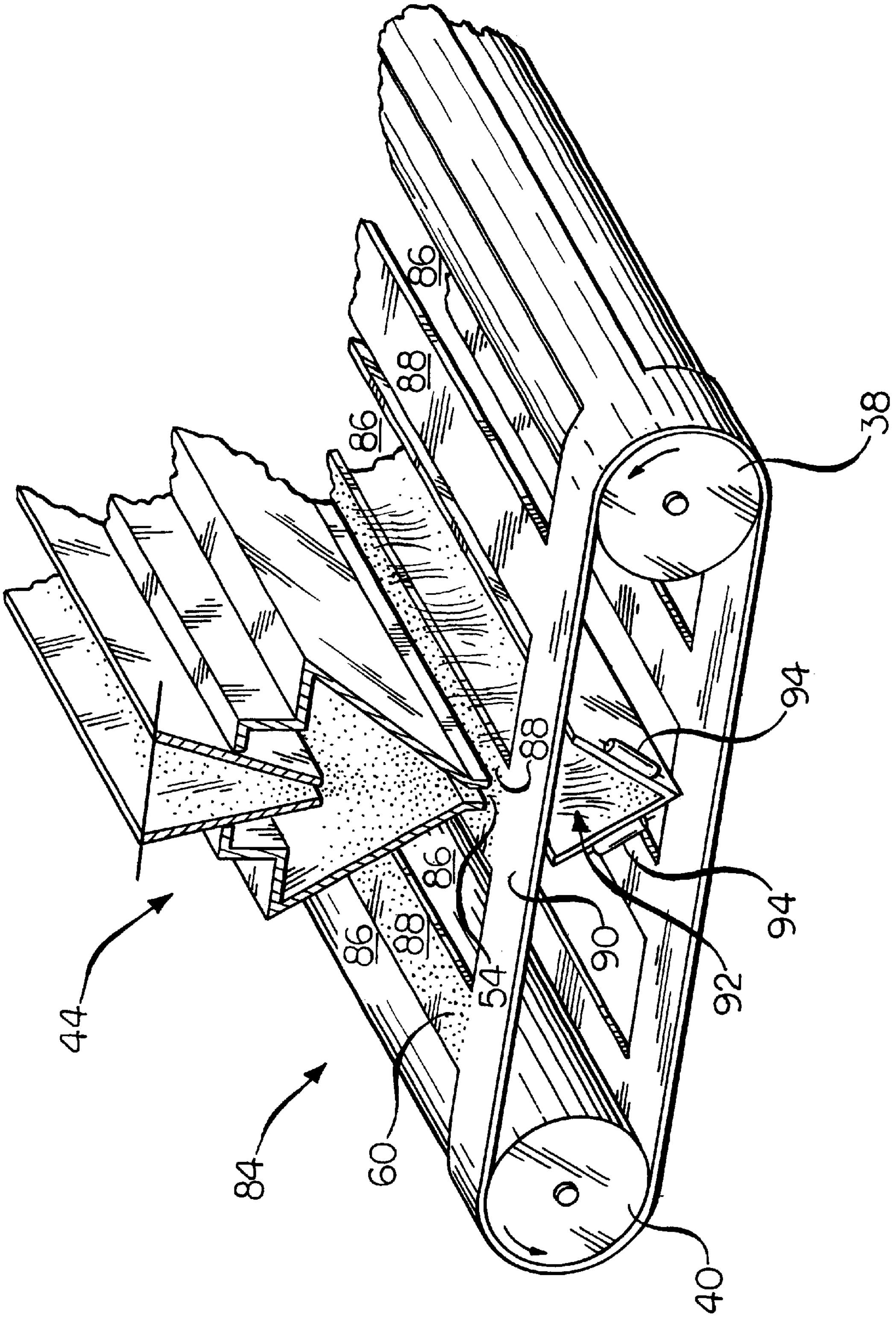
FIG. 4 is a schematic perspective view of an alternate arrangement for creating the blend drops, using a blend drop belt provided with a series of openings spaced apart by a series of panels.

In another embodiment of the invention, an alternate arrangement for creating the blend drops is shown in FIG. 4. A blend drop belt 84 is provided with a series of openings, shown as rectangular openings 86 that are spaced apart by a series of panels 88. A continuous edge strip 90 supports the belt 84 and enables it to be propelled around the forward roller 38 and the rear roller 40. The blend drop applicator 44 drops a curtain or stream 54 of granules 52. The granules that land on one of the panels 88 form a blend drop 60 that is carried around the rear roller 40 and deposited on the asphalt coated sheet 20 in the manner described above with respect to FIGS. 1–3, or in any other suitable manner. The granules that drop onto or through the openings 86 in the belt 84 are collected by any suitable means, such as by a V-belt conveyor 92 positioned beneath the upper flight of the belt 84, and supported by a series of rollers 94.

In addition to the embodiments disclosed above, an additional embodiment includes the use of a drum, not shown, that is similar to the rear roller 40, but has grooves or recessed areas that act as collection areas or pockets for holding blend drop granules. This embodiment does not use a belt similar to the belt 32, but rather the blend drop granules are metered right onto the drum. The use of the recessed areas helps clearly define the boundaries of the blend drop. A wiper or scraper blade can be used to meter the granules into each of the recessed areas so that the recessed areas have an even thickness of granules and so that no granules remain on the drum surface outside of the recessed areas. Once the blend drops are defined in the recessed areas, the rotation of the drum causes the blend drops to be turned upside down so that they are moving in the machine direction before being released. The magnet of the invention holds the blend drop granules on the drum until the appropriate time for release. As alternative to this embodiment, a recessed belt could mounted to travel around a non-recessed roller similar to roller 40. The recessed belt contains recessed areas similar to those in the drum disclosed above. The magnet would hold the blend drop granules in the belt recessed areas until the appropriate time for release.

Figure 5:
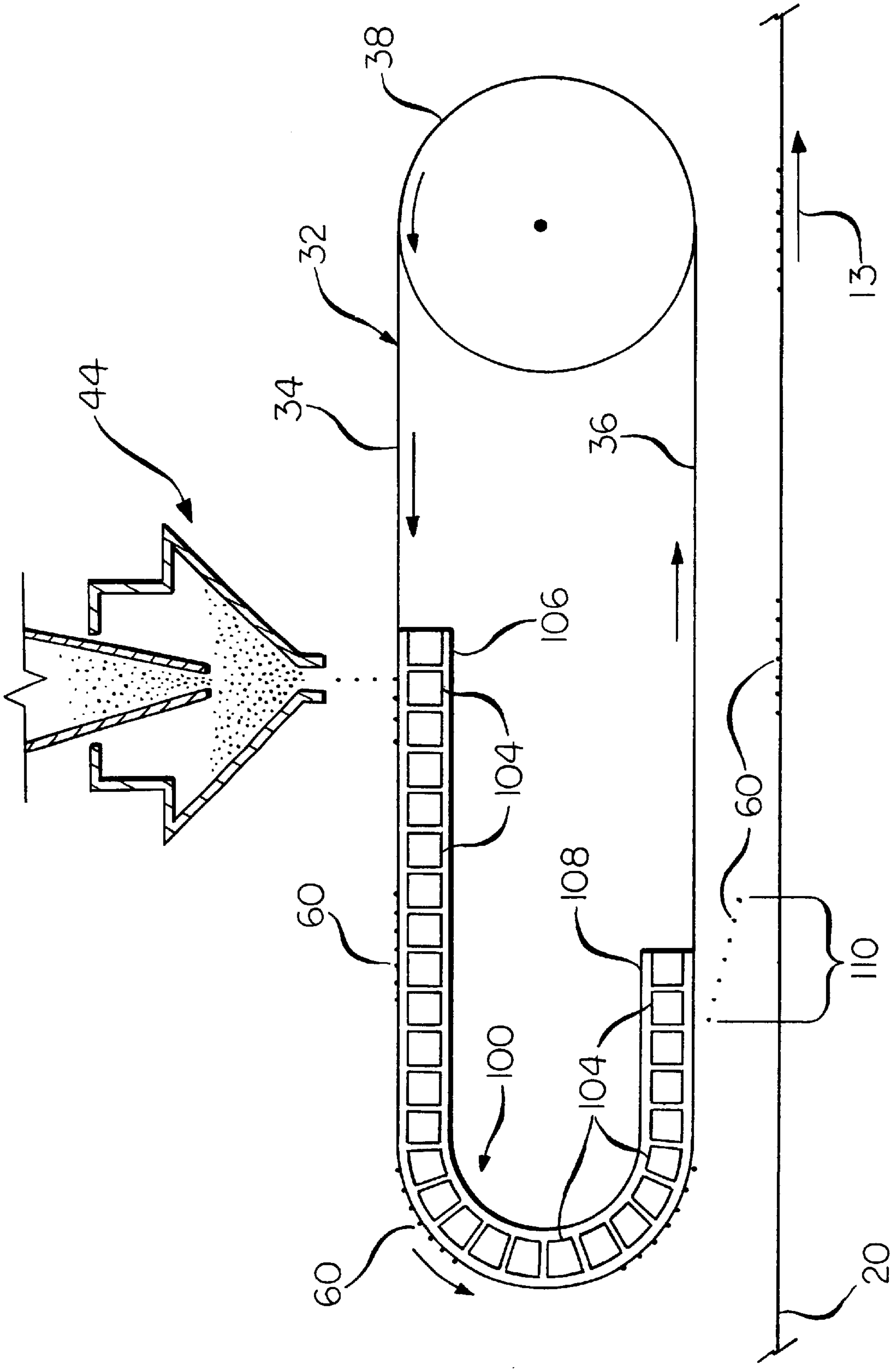
FIG. 5 is a schematic view in elevation of a different embodiment of the invention, including a permanent magnetic belt.

In the embodiment shown in FIG. 5, the upper flight 34 of the belt 32 passes beneath the blend drop applicator 44 where blend drops 60 are deposited on the belt. As in the embodiments above, any suitable means of creating the blend drops can be used. The belt 32 is mounted to travel around forward roller 38 at the forward end, and around a stationary bank 100 of magnets 104 at the rear end. The stationary bank 100 of magnets 104 extends rearward from a starting position 106 beneath the blend drop applicator 44, around the rear of the blend drop conveyor, and then along the lower flight 36. The magnets can be operated as a permanently fixed unit, with the magnets continuously providing a magnetic force to retain the blend drop granules in contact with the belt 32. As the belt 32 travels past the downstream end 108 of the bank 100 of magnets, the influence of the magnetic force will become diminished, and the blend drops 60 will be released and fall from the lower flight onto the asphalt coated sheet 20. The movement of the belt 32 around the stationary bank of magnets changes the direction of the granules to a generally horizontal orientation in the machine direction.

In an alternative operation of the apparatus shown in FIG. 5, some or all of the magnets or cells 104 can be configured to be switched, either on or off. For example, a specific reversal portion 110 of the magnets could be set up so that they can be switched off to shut down the magnetic field supplied by the magnets, thereby releasing the granules of the blend drop onto the asphalt coated sheet.

In yet another arrangement of the apparatus shown in FIG. 5, the individual magnets 104 in the bank 100 can be switched on and off (or positive and negative) in waves from the starting position 106 to the downstream end 108. The magnets are switched on and off in a manner similar to the moving lights in a movie marquee. The switching and control of the magnets can be by any suitable means, such as a computer controlled magnet activating system, not shown, that can be programmed to coordinate the wave-like activation of the individual magnets. The switching would be coordinated with the movement of the blend drops 60 on the belt 32, with the blend drops being held in place in contact with the belt by a moving magnetic force created by the wave-like switching on and off of the magnets 104. An advantage of this method is that the granules will continuously be formed to the desired blend drop shape all the way around the length of the bank 100 of the magnets. It is to be understood that the embodiments illustrated in FIG. 5 could use any of numerous methods for creating the blend drops 60 on the belt 32.

Figure 6:
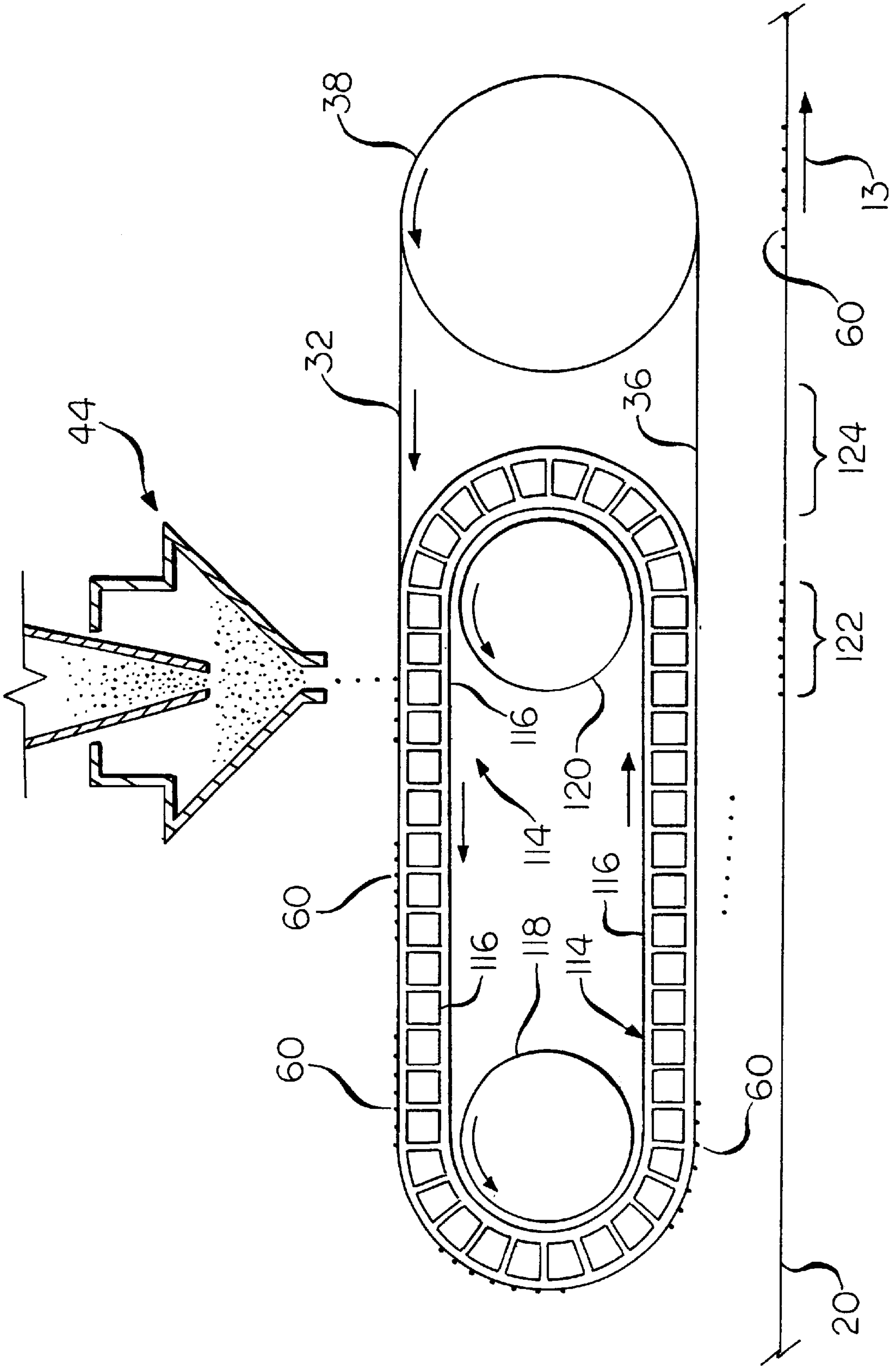
FIG. 6 is a schematic view in elevation of yet another embodiment of the invention, showing a traveling magnetic belt.

FIG. 6 illustrates apparatus similar to that shown in FIG. 5, except that the bank 114 of cells or magnets 116 is mounted to rotate around a rear roller 118 and an intermediate roller 120. The magnets 116 can be similar to those described above. Since the magnets 116 are rotating around the rear roller 118 and intermediate roller 120, and therefore traveling directly with the belt 32, they can be permanent magnets that are arranged to coincide with the desired blend drops 60. For example, the magnets 116 adjacent the area of the belt 32 where a blend drop 60 is desired can be set to provide an attractive magnetic force. In contrast, where no granules are wanted on the belt 32, the corresponding magnets 116 can be switched off so that the granules will not be attracted. In a manner similar to that explained above for FIG. 5, the blend drops can be released from the belt 32 in several ways. The individual magnets holding the blend drop granules upside down on the lower flight 36 of the belt 32 can be switched in polarity to release the granules when the blend drop reaches a desired release position 122. Alternatively, the blend drop can be released at a release position 124 where the magnetic force loses its effect as the belt 32 carries the blend drop past the intermediate roller 120 in the downstream direction. It can be seen that the movement of the belt 32 around the rotating bank 114 of magnets changes the direction of the granules to a generally horizontal orientation in the machine direction.

Figure 7:
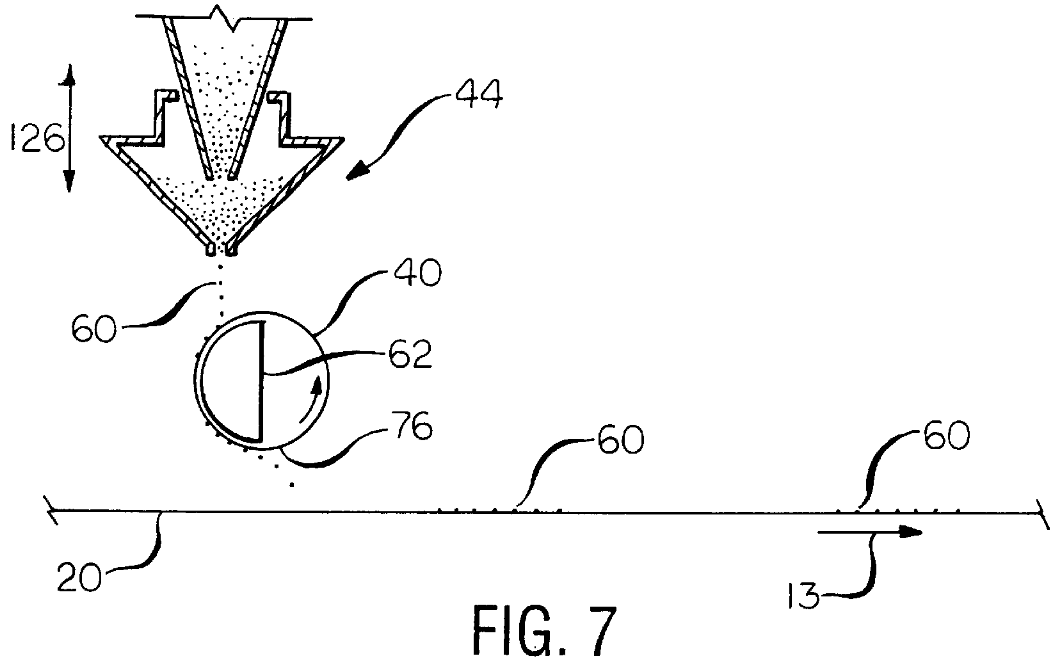
FIG. 7 is a schematic view in elevation of another embodiment of the invention, in which a blend drop depositing apparatus is positioned to deposit blend drops in the vicinity of a stationary magnet.

As shown in FIG. 7, in another embodiment of the invention, the blend drop applicator 44 can be positioned to generate a vertically moving blend drop 60 of granules that is directed into generally tangential contact with a roller 40. The roller has positioned within it a magnet 62 that is stationary, but exerts a magnetic force on the blend drop granules to keep them in contact with the roller 40. Although the magnet 62 is shown as having a semicircular cross-sectional shape, it is to be understood that the magnet can have other shapes, such as a quarter circle cross-sectional shape, not shown, merely providing a magnetic force in the southwest or lower left quadrant of the area of the roller 40, as viewed in FIG. 7. No outer belt 32 is needed, although one could be used if desired. After the blend drop granules pass the lowest point 76 of the roller 40, the influence of the magnet is diminished and the blend drop is released for contact with the asphalt coated sheet 20. The movement of the roller 40 changes the direction of the granules under the influence of the magnetic force to a generally horizontal orientation in the machine direction.

As the blend drop granules fall toward the roller they are travelling in a direction that is roughly tangent to the roller 40. Therefore, the blend drop granules gently come into contact with the roller and then smoothly follow the curve of the roller. The roller can be operated at any speed, but preferably it moves at a linear speed substantially equal to the speed of the asphalt coated sheet 20. Although the blend drop granules contact the roller 40 in a tangent direction, it is to be understood that the granules can contact the roller at a low angle, such as an angle within the range of from about 0 to about 30 degrees, with respect to the roller surface. The greater the angle of contact or incidence with the belt, the higher the likelihood of granule scatter.

One of the advantages of the embodiment illustrated in FIG. 7 is that the granules flowing from the blend drop applicator that are intercepted by or come into contact with the roller 40 can be traveling at substantially at the linear speed of the roller 40, and hence substantially at the speed of the asphalt coated sheet 20, thereby minimizing the scattering or bouncing of the granules. The granules never come into contact with a moving surface that is traveling at a speed substantially different from the speed of the granules. After the blend drop granules exit the blend drop applicator 44, they accelerate due to gravity. By positioning the blend drop applicator 44 at the correct height above the roller 100, the downward speed of the granules at the time they are intercepted by the roller can be predetermined. In order to accommodate changes in line speed for the asphalt coated sheet, the blend drop applicator 44 can be mounted for vertical adjustment, as indicated by directional arrow 126. Raising the blend drop applicator 44 increases the distance for acceleration, thereby increasing the ultimate granule speed. Alternatively, the roller 40, rather than the blend drop is applicator 44, can be mounted for vertical adjustment.

Figure 8:
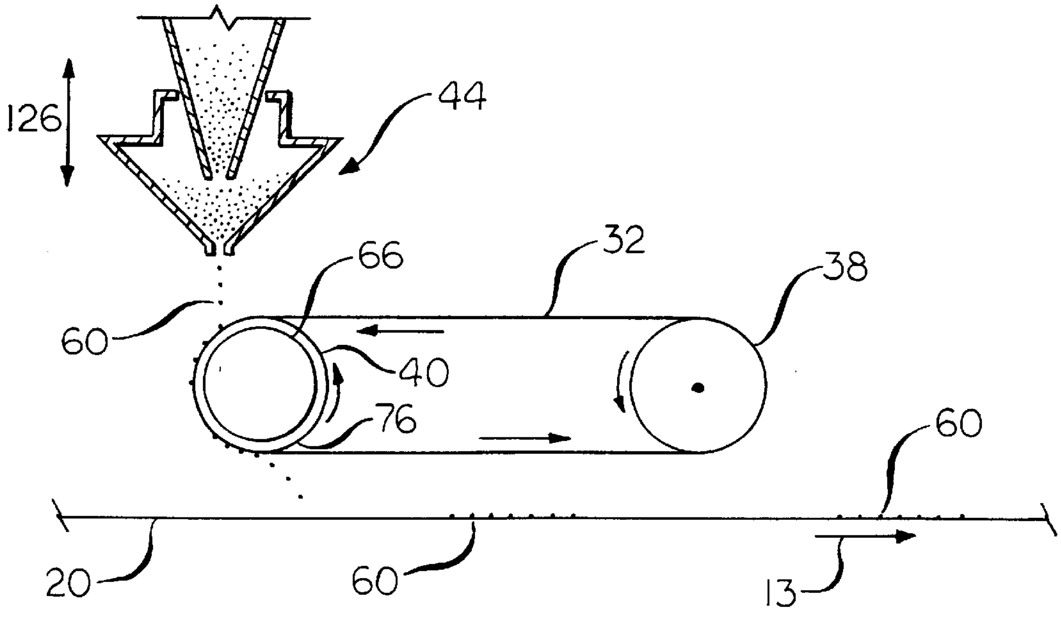
FIG. 8 is a schematic view in elevation of a different embodiment of the invention, in which a blend drop depositing apparatus is positioned to deposit blend drops in the vicinity of a rotating magnet.

The apparatus in FIG. 8 is similar to the apparatus shown in FIGS. 3 and 7, FIG. 8 shows that the roller 40 can contain a magnet 66 that rotates with the roller to provide a magnetic force. The magnetic force intercepts the falling blend drop 60 and retains the granules in contact with the belt 32 until the granules are moving in the machine direction. The separation of the belt 32 from the roller 40 and rotating magnet 66 after the lowest point 76 of the roller is reached causes the blend drop to be released in a manner similar to that disclosed above. The speeds of the roller and belt, the asphalt coated sheet 20, and the vertically moving free falling granules can be made to be substantially equal for a minimum of granule scattering. The relative speed of the free falling granules can be adjusted by vertical movement of the blend drop applicator, as described above. It can be seen that the movement of the belt 32 around the roller 40 under the influence of the magnetic force changes the direction of the granules to a generally horizontal orientation in the machine direction.

Figure 9:
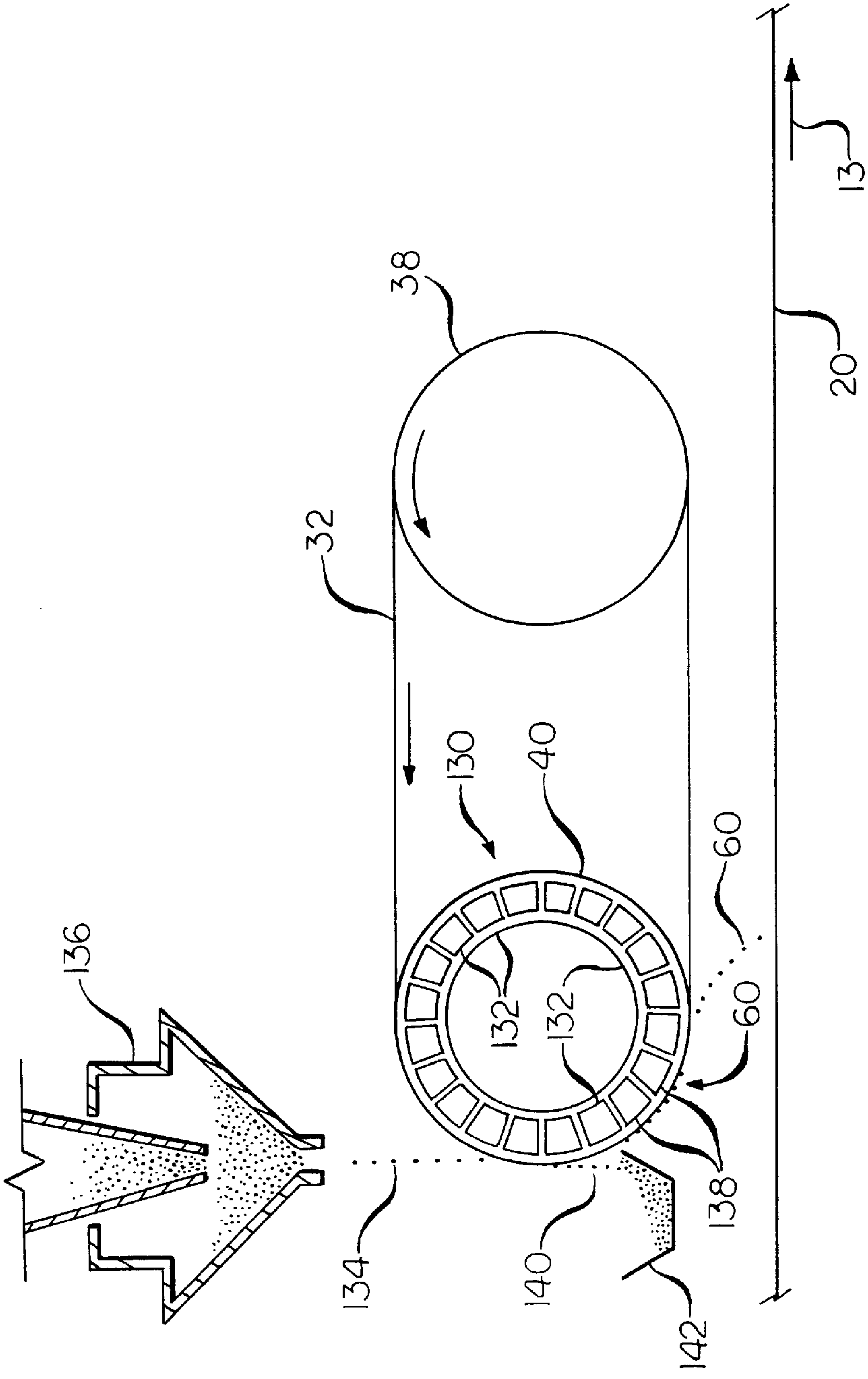
FIG. 9 is a schematic view in elevation of yet another embodiment of the invention.

As shown in FIG. 9, in yet another embodiment of the invention, the rear roller 40 contains an array 130 of magnets 132 that rotate with the roller to provide a magnetic force. The magnets can be pixels that are individually controllable so that any individual magnet 132 can be switched on or off by the action of a controller, not shown. A falling curtain or stream 134 of granules is generated by the blend granule applicator 136, which can be similar to the blend drop applicator 44 in the embodiments described above, or can be merely a source of flowing granules. The rear roller 40 and a forward roller 38 define a path for the belt 32. As the curtain 134 of granules reaches the circular array 130 of magnets 132, some of the magnets, such as, specifically, magnets 138, for example, will be switched on, and some of the magnets will be switched off. The granules will be attracted to the magnets that are switched on, and will adhere to the belt 32 to form a blend drop 60. In contrast, the granules intercepted by magnet areas of the array that are switched off simply bounce off or fall off the belt 32 and fall as a waste stream 140 of granules into the return hopper 142 for recycling. Therefore, it can be seen that the array 130 of magnets includes some magnets that are switched on to attract the blend drop granules and create a blend drop, and includes some areas without switched on magnets that do not attract granules and from which the granules fall as a waste stream of granules. The areas of non-switched on magnets can be magnets that are switched off or can be non-magnetic areas.

Once the blend drops 60 are defined on the belt 32 by the magnets 138 and other switched on magnets, further rotation of the belt carries the blend drop with it, and the blend drop granules are retained in contact with the belt 32 until the granules are moving in the machine direction. The separation of the belt 32 from the roller 40 and rotating array of magnets 130 causes the blend drop to be released in a manner similar to that disclosed above. The speeds of the roller and belt, the asphalt coated sheet 20, and the vertically moving free falling granules can be made to be substantially equal for a minimum of granule scattering. The relative speed of the free falling granules can be adjusted by vertical movement of the blend drop applicator, as described above. It can be seen that the movement of the belt 32 around the roller 40 under the influence of the magnetic force changes the direction of the granules to a generally horizontal orientation in the machine direction. By operating the controller in an appropriate manner, the size, shape and frequency of the switched on magnets, and therefore of the blend drops created by the magnets, can be controlled to create the desired blend drop pattern.

The principle and mode of operation of this invention have been described in its preferred embodiments. However, it should be noted that this invention may be practiced otherwise than as specifically illustrated and described without departing from its scope.

What is claimed is:

1. Apparatus for applying blend drop granules to an asphalt coated sheet comprising:

a blend drop conveyor for receiving blend drop granules, the blend drop conveyor being positioned above an asphalt coated sheet traveling in a machine direction, the blend drop conveyor having an upper flight moving in a direction opposite the machine direction and a lower flight moving in the machine direction; and a bank of magnets for retaining the blend drops in contact with the blend drop conveyor by magnetic force while the blend drops are moved from the upper flight to the lower flight of the blend drop conveyor, and for releasing the blend drops onto the asphalt coated sheet.

2. The apparatus of claim 1 in which the blend drop conveyor is mounted for travel around a rotatable magnet to move the blend drops from the upper flight to the lower flight of the blend drop conveyor, wherein the bank of magnets is adapted to maintain the blend drops in contact with the blend drop conveyor.

3. The apparatus of claim 1 including a pneumatically assisted blend drop applicator for depositing the blend drops of granules on the blend drop conveyor.

4. The apparatus of claim 1 in which the blend drop conveyor is mounted for travel around a forward roller at a forward end and around the bank of magnets at a rear end to move the blend drops from the upper flight to the lower flight of the blend drop conveyor, the bank of magnets being adapted to maintain the blend drops in contact with the blend drop conveyor.

5. The apparatus of claim 1 in which the blend drop conveyor is mounted for travel around a forward roller at a forward end and a rotating bank of magnets at a rear end, the rotating bank of magnets maintaining the blend drops in contact with the blend drop conveyor.

6. The apparatus of claim 5 in which the bank of magnets is mounted for rotation about a rear roller and an intermediate roller.

7. Apparatus for applying blend drop granules to an asphalt coated sheet comprising:

a blend drop depositing apparatus for generating vertically moving blend drops of granules, the blend drop apparatus being positioned above an asphalt coated sheet moving in a machine direction; and a magnet for changing the direction of the blend drops of granules to a generally horizontal orientation in the machine direction, and for releasing the blend drops onto the asphalt coated sheet.

8. The apparatus of claim 7 in which the magnet is a rotating magnet for intercepting the vertically moving blend drops of granules to change the direction of the blend drops of granules to a generally horizontal orientation in the machine direction.

9. The apparatus of claim 7 including a pneumatically assisted blend drop applicator for generating the vertically moving blend drops of granules.

10. Apparatus for applying blend drop granules to an asphalt coated sheet comprising:

a blend granule applicator for generating a stream of blend drop granules, the blend granule applicator being positioned above an asphalt coated sheet moving in a machine direction; and an array of spaced apart magnets positioned to intercept the stream of blend drop granules, wherein the magnets attract the blend drop granules and create blend drops, and wherein the spaces between the magnets do not attract granules so that granules intercepted by the spaces between the granules fall as a waste stream of granules, the array of magnets being mounted for movement so that the blend drops are changed from a generally vertical direction to a generally horizontal orientation in the machine direction before release of the blend drops for contact with the asphalt coated sheet.

11. The apparatus of claim 10 in which the magnets are permanent magnets.

12. The apparatus of claim 10 wherein the array of magnets includes magnets that are switched on to attract the blend drop granules and create blend drops, and the spaces between the switched on magnets includes magnets that are not switched on and that do not attract granules.

13. The apparatus of claim 10 including means for recovering the waste stream granules.

14. The apparatus of claim 10 wherein the array of magnets is positioned within a roller.

15. Apparatus for applying blend drop granules to an asphalt coated sheet comprising:

a blend drop conveyor for receiving blend drop granules, the blend drop conveyor being positioned above an asphalt coated sheet traveling in a machine direction, the blend drop conveyor having an upper flight moving in a direction opposite the machine direction and a lower flight moving in the machine direction;

a magnet for retaining the blend drops in contact with the blend drop conveyor by magnetic force while the blend drops are moved from the upper flight to the lower flight of the blend drop conveyor, and for releasing the blend drops onto the asphalt coated sheet; and a pneumatically assisted blend drop applicator for depositing the blend drops of granules on the blend drop conveyor.

16. The apparatus of claim 15 in which the blend drop conveyor is mounted for travel around a rotatable magnet to move the blend drops from the upper flight to the lower flight of the blend drop conveyor, wherein the magnet is adapted to maintain the blend drops in contact with the blend drop conveyor.

17. The apparatus of claim 15 including a pneumatically assisted blend drop applicator for depositing the blend drops of granules on the blend drop conveyor.

18. The apparatus of claim 15 in which the blend drop conveyor is mounted for travel around a forward roller at a forward end and around a stationary bank of magnets at a rear end to move the blend drops from the upper flight to the lower flight of the blend drop conveyor, the stationary band of magnets being adapted to maintain the blend drops in contact with the blend drop conveyor.

19. The apparatus of claim 15 in which the blend drop conveyor is mounted for travel around a forward roller at a forward end and a rotating bank of magnets at a rear end, the rotating bank of magnets maintaining the blend drops in contact with the blend drop conveyor.

20. The apparatus of claim 19 in which the bank of magnets is mounted for rotation about a rear roller and an intermediate roller.

* * * * *